(12) United States Patent
Duesterhoeft et al.

(10) Patent No.: US 8,192,233 B2
(45) Date of Patent: Jun. 5, 2012

(54) CONNECTOR ASSEMBLY FOR A PHOTOVOLTAIC MODULE

(75) Inventors: Scott Stephen Duesterhoeft, Etters, PA (US); Stephen Daniel Gherardini, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/777,068

(22) Filed: May 10, 2010

(65) Prior Publication Data

US 2011/0275244 A1 Nov. 10, 2011

(51) Int. Cl.
*H01R 13/66* (2006.01)
(52) U.S. Cl. .................. 439/620.21; 439/76.1
(58) Field of Classification Search ............... 439/76.1, 439/274, 466, 468, 731, 854, 855, 620.21, 439/620.22
See application file for complete search history.

(56) References Cited

U.S. PATENT DOCUMENTS

| 4,112,941 | A | * | 9/1978 | Larimore ................. 600/394 |
| 4,310,211 | A | * | 1/1982 | Bunnell et al. ............ 439/358 |
| 4,460,232 | A | * | 7/1984 | Sotolongo ................ 439/535 |
| 5,232,383 | A | * | 8/1993 | Barnick ................... 439/859 |
| 5,746,618 | A | * | 5/1998 | Gauker ................... 439/352 |
| 6,676,455 | B2 | * | 1/2004 | Machado ................. 439/855 |
| 7,648,371 | B2 | * | 1/2010 | Boensch et al. .......... 439/76.1 |
| 7,824,190 | B2 | * | 11/2010 | Beck et al. .............. 439/76.1 |
| 2009/0260676 | A1 | | 10/2009 | McMahon et al. |

FOREIGN PATENT DOCUMENTS

| DE | 202007005126 U1 | 8/2008 |
| DE | 202007012096 U1 | 1/2009 |
| EP | 2166622 A2 | 3/2010 |

OTHER PUBLICATIONS

International Search Report, International Application No. PCT/US2011/000812, International Filing Date, Oct. 5, 2011.

\* cited by examiner

*Primary Examiner* — Thanh Tam Le

(57) ABSTRACT

A connector assembly for a photovoltaic module includes a locator having a support rib configured to hold a buss of the photovoltaic module, and a connector housing holding a contact. The connector housing is configured to be mounted to the photovoltaic module over the locator such that the contact is mated to the buss in a press-fit connection.

19 Claims, 5 Drawing Sheets

CONNECTOR ASSEMBLY FOR A PHOTOVOLTAIC MODULE

BACKGROUND OF THE INVENTION

The subject matter herein relates generally to photovoltaics modules, and more particularly, to connector assemblies for photovoltaic modules.

Photovoltaic (PV) modules or arrays produce electricity from solar energy. A photovoltaic module is the basic element of a photovoltaic power generation system. A PV module has many solar cells interconnected in series or parallel, according to the desired voltage and current parameters. PV cells are essentially large-area semiconductor diodes. PV cells are connected and placed between a polyvinyl plate on the bottom and a tempered glass on the top. PV cells are interconnected with thin contacts, or bussing foils, on the upper side of the semiconductor material.

PV modules/arrays require specially designed connectors adapted for interconnecting the various PV modules/arrays with each other, and with electrical power distribution systems. PV connection systems are used to accommodate serial and parallel connection of PV arrays. The connectors allow for field installation of made-to-length cable assemblies. The connectors are terminated to the bussing foils at ends of the bussing foils. Typically, the connectors are soldered to the bussing foils or secured to the bussing foils using a specially designed mechanical clamp. Automated connection to the bussing foils has heretofore proven difficult, making connection to the bussing foils is time consuming and expensive.

A need remains for a connector for a PV module that may be made in a cost effective and reliable manner.

BRIEF DESCRIPTION OF THE INVENTION

In one embodiment, a connector assembly is provided for a photovoltaic module that includes a locator having a support rib configured to hold a buss of the photovoltaic module, and a connector housing holding a contact. The connector housing is configured to be mounted to the photovoltaic module over the locator such that the contact is mated to the buss in a press-fit connection.

In another embodiment, a connector assembly for a photovoltaic module is provided including a locator having a first support rib configured to hold a first buss of the photovoltaic module and a second support rib configured to hold a second buss of the photovoltaic module. The connector assembly also includes a connector housing holding a first contact and a second contact. The connector housing is configured to be mounted to the photovoltaic module over the locator such that the first and second contacts are mated to the first and second buss, respectively, in press-fit connections.

In a further embodiment, a connector assembly for a photovoltaic module is provided including a locator having a support rib having a first side and a second side. The locator is positioned on the photovoltaic module such that a buss of the photovoltaic module is wrapped around the support rib on the first and second sides of the support rib. The connector assembly includes a connector housing holding a contact and a mounting end with an opening through the mounting end. The connector housing is configured to be mounted to the photovoltaic module in a loading direction such that the locator is loaded through the mounting end. The contact engages the buss on the first and second sides in a press-fit connection as the connector housing is moved in the loading direction.

DETAILED DESCRIPTION OF THE INVENTION

Figure 1:
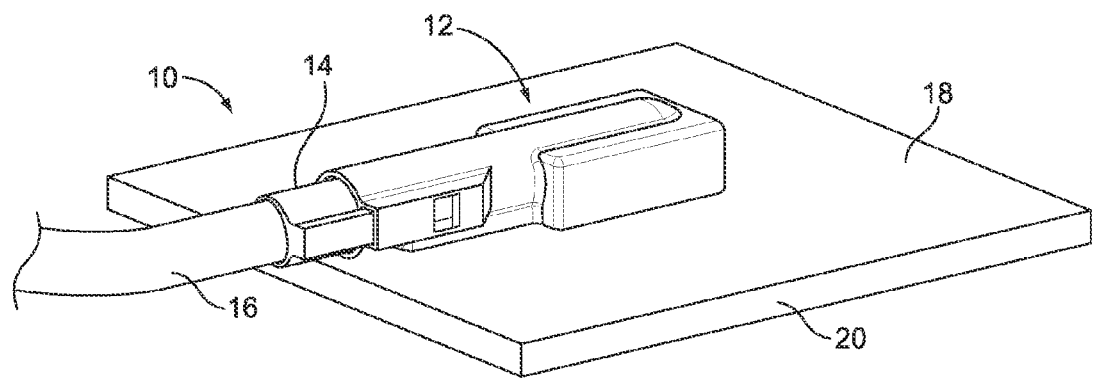
FIG. 1 illustrates a photovoltaic (PV) module and connector assembly for the PV module formed in accordance with an exemplary embodiment.

FIG. 1 illustrates a photovoltaic (PV) module 10 and connector assembly 12 for the PV module 10. The connector assembly 12 is connected to an output plug 14 provided at an end of a cable 16. The PV module 10 may form part of an array, in which multiple PV modules 10 are arranged together, such as side by side, where the cable 16 interconnects the PV module 10 with an adjacent PV module or another component of the PV power generation system. The connector assembly 12 may be arranged anywhere along a mounting surface 18 of the PV module 10. The connector assembly 12 may be arranged along an edge 20 of the PV module 10 in some embodiments.

Figure 2:
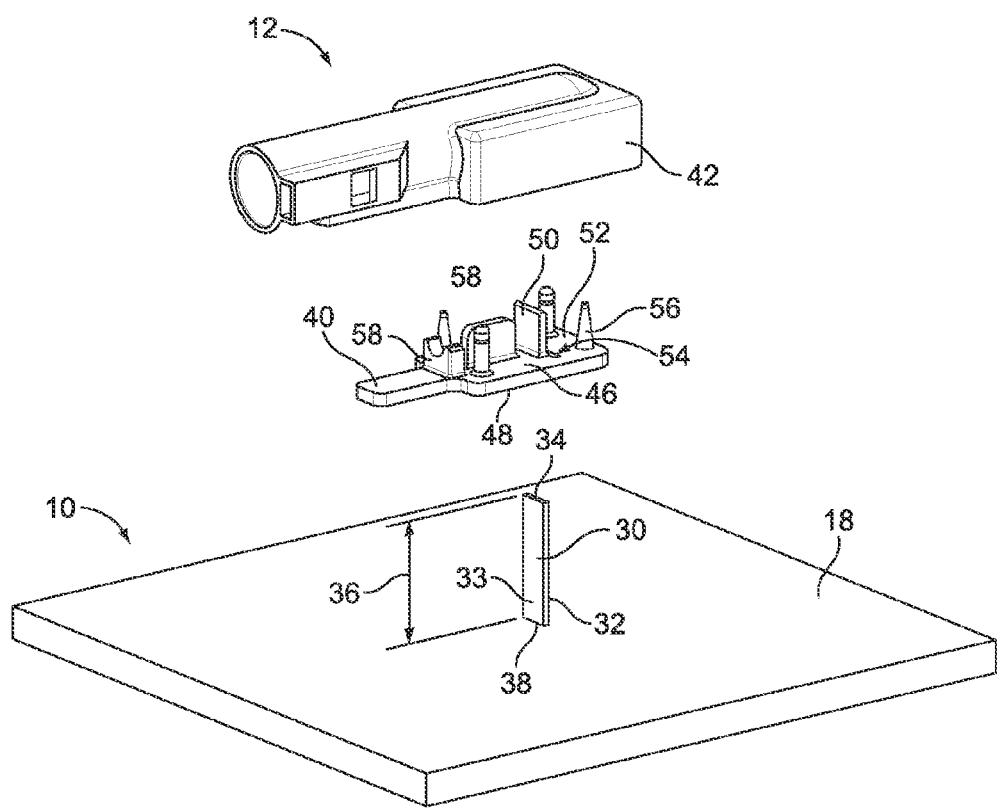
FIG. 2 is an exploded view of the connector assembly shown in FIG. 1.

FIG. 2 is an exploded view of the connector assembly 12 positioned relative to the PV module 10. A buss 30 extends from the mounting surface 18. The buss 30 is connected to an electrode (not shown), or another part of the PV module 10, internal to the PV module 10. The buss 30 is electrically connected to the PV cells (not shown) of the PV module 10 and conveys power from the PV cells. The buss 30 is a conductive metal strip or conductor. In the illustrated embodiment, the buss 30 is a thin, flat foil. The buss 30 includes a first side 32 and a second side 33 opposite the first side 32. The buss 30 extends to a distal end 34 and has a length 36 measured from an interface 38 to the distal end 34.

The connector assembly 12 includes a locator 40 and a connector housing 42. The locator 40 is configured to be mounted to the mounting surface 18 proximate to the buss 30. The locator 40 is used to locate the buss 30 for mating with a contact 44 (shown in FIG. 4) held within the connector housing 42. The connector housing 42 is configured to be mounted to the mounting surface 18 over the locator 40 once the locator 40 and buss 30 are positioned.

The locator 40 includes a locator body 46 having a mounting end 48. The mounting end 48 may be generally planar and may rest on the mounting surface 18. The locator 40 includes a support rib 50 extending from a top 52 of the locator body 46. The top 52 is generally opposite the mounting end 48. The support rib 50 may extend perpendicular from the locator body 46. The support rib 50 is positioned adjacent a slot 54 formed through the locator body 46. The slot 54 is sized and shaped to receive the buss 30 therethrough when the locator 40 is mounted to the mounting surface 18. The locator 40 includes alignment posts 56 that align the connector housing 42 with the locator 40 during assembly of the connector assembly 12. The locator 40 includes contact supports 58 that support the contact 44 and hold the contact 44 in position with respect to the locator 40.

Figure 3:
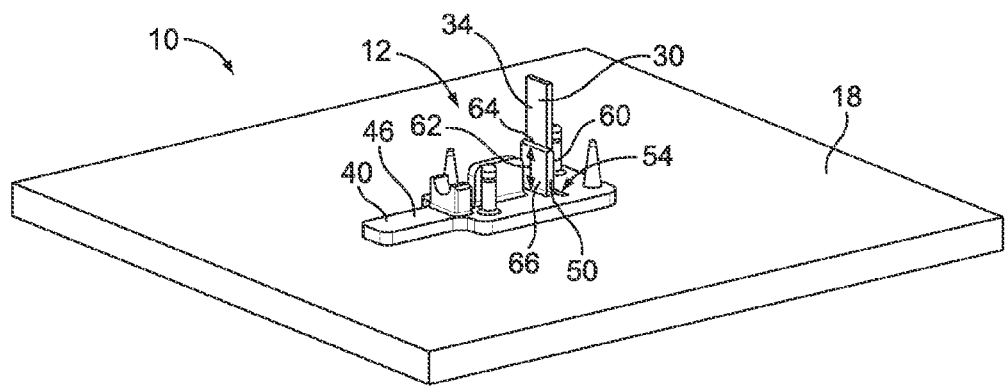
FIG. 3 is a partially assembled view of the connector assembly shown in FIG. 1.

FIG. 3 is a partially assembled view of the connector assembly 12 illustrating the locator 40 mounted to the PV module 10. Optionally, the locator 40 may be mounted to the PV module 10 by a machine during an automated process. For example, the locator 40 may be positioned such that the slot 54 is aligned with the buss 30, and then the locator 40 is loaded downward onto the mounting surface 18.

When the locator 40 is mounted to the PV module 10, the buss 30 extends through the slot 54 and generally extends along a first side 60 of the support rib 50. The support rib 50 has a length 62 measured between the locator body 46 and a top 64 of the support rib 50. The second side 33 of the buss 30 extends along and may engage the first side 60 of the support rib 50. In an exemplary embodiment, the length 36 (shown in FIG. 2) of the buss 30 is greater than the length 62 of the support rib 50. The buss 30 may be wrapped around the top 64 such that the buss 30 extends along a second side 66 of the support rib 50. For example, the buss 30 may be folded or bent proximate to the top 64. Optionally, the buss 30 may be folded by a machine during an automated process.

Figure 4:
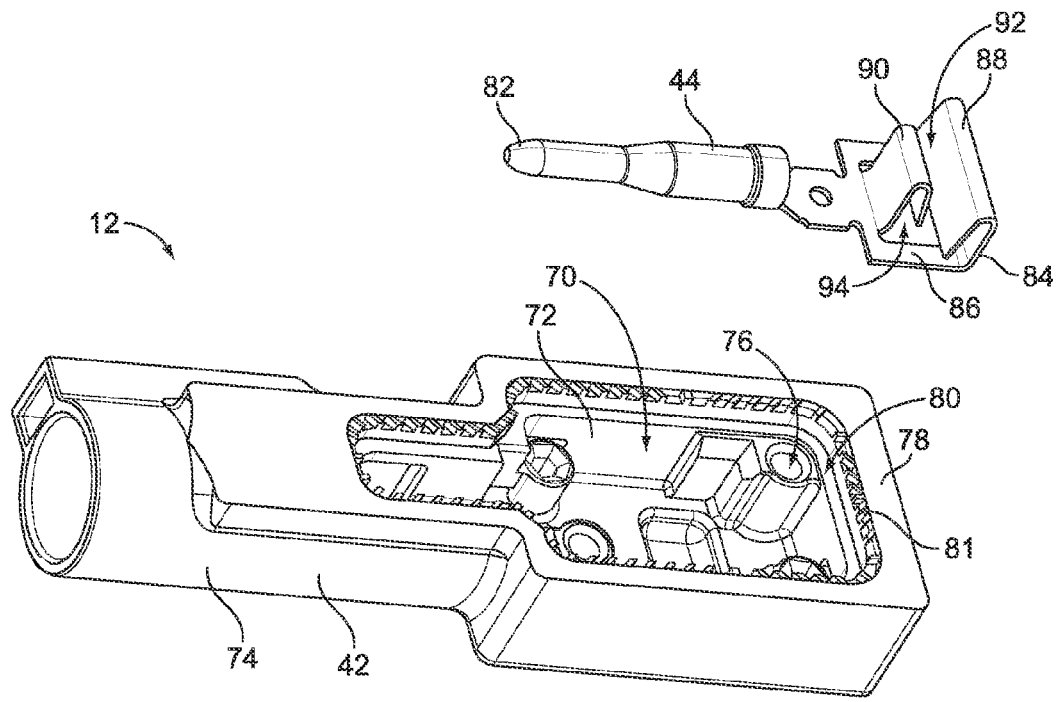
FIG. 4 is a bottom perspective view of a portion of the connector assembly shown in FIG. 1.

FIG. 4 is a bottom perspective view of a portion of the connector assembly 12 illustrating the connector housing 42 and the contact 44. The connector housing 42 includes a cavity 70 bounded by a plurality of walls 72. Optionally, the walls 72 may have a box shape with a barrel 74 extend from a front of the box. The contact 44 is configured to be loaded into the cavity 70 and is held therein. The locator 40 (shown in FIGS. 2 and 3) is also configured to be loaded into the cavity 70 when the connector housing 42 is mounted over the locator 40. The connector housing 42 includes alignment openings 76 that receive the alignment posts 56 (shown in FIG. 2) of the locator 40 to align the connector housing 42 with the locator 40 during assembly of the connector assembly 12. In an alternative embodiment, the locator 40 may include alignment openings and the connector housing 42 may include alignment posts or different types of alignment features may be used to align the connector housing 42 with the locator 40.

The connector housing 42 includes a mounting end 78 having an opening 80 through the mounting end 78. The mounting end 78 may be generally planar and define a sealing surface of the connector housing 42. The mounting end 78 may include treads 81 adjacent the opening 80 or along a perimeter of the mounting end 78. The treads 81 define a knurled surface, which may facilitate reception of a sealant at the mounting end 78. The locator 40 may also include treads or a knurled surface at a perimeter thereof that interacts with the mounting end 78 to seal the opening 80.

The opening 80 provides access to the cavity 70. The contact 44 is loaded through the opening 80 into the cavity 70. The locator 40 is configured to be loaded into the cavity 70 through the opening 80 when the connector housing 42 is mounted to the mounting surface 18 (shown in FIG. 1) of the PV module 10 (shown in FIG. 1). The contact 44 is loaded into the cavity 70 such that a portion of the contact 44 extends into the barrel 74 for mating with a corresponding mating contact of the plug 14 (shown in FIG. 1).

The contact 44 is a conductive member that is configured to be terminated to the buss 30 (shown in FIGS. 2 and 3) by a press-fit connection. The contact 44 is terminated to the buss 30 without soldering or another secondary termination process. The contact 44 may be terminated to the buss 30 during an automated pressing operation, wherein the contact 44 slides over the buss 30 and electrical contact is made by the direct physical connection of the contact 44 with the buss 30.

The contact 44 includes a mating end 82 and a mounting end 84. The mating end 84 is configured for mating engagement with a mating contact of the plug 14. The mounting end 84 is configured for press-fit engagement with the buss 30. In an exemplary embodiment, the contact 44 may be stamped and formed from a metal stock and formed into an appropriate shape. The mating end 82 may be rolled into a barrel shape. The mounting end 84 may include a planar base 86 having a pair of fingers 88, 90 extending from the base 86. The fingers 88, 90 are bent out of plane from the base 86. The fingers 88, 90 may be curved into a U-shape to define spring fingers. The fingers 88, 90 are deflectable and may be biased against the buss 30 when mated thereto. The fingers 88, 90 face one another and define a receiving space 92 therebetween for receiving the buss 30. Distal ends of the fingers 88, 90 may engage one another, and may be spread apart from one another when mounted to the buss 30. The base 86 includes an opening 94 therein aligned with the fingers 88, 90.

Figure 5:
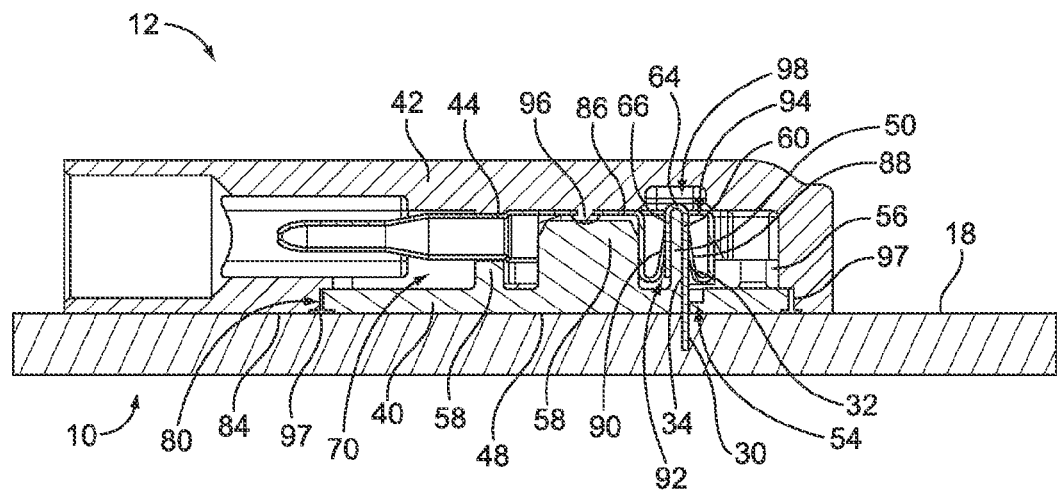
FIG. 5 is a cross sectional view of the connector assembly shown in FIG. 1.

FIG. 5 is a cross sectional view of the connector assembly 12 mounted to the PV module 10. The buss 30 is illustrated extending from the PV module 10 through the slot 54 along the support rib 50. The slot 54 may be oversized compared to the buss 30 (e.g. wider than the buss 30) to provide space for the buss 30 to be loaded through the slot 54 without damaging the buss 30. The slot 54 may be chamfered at the mounting end 48 to locate the buss 30 within the slot 54 during mounting of the locator 40 to the PV module 10. Once the locator 40 is positioned with the buss 30 extending along the support rib 50, the buss 30 is wrapped around the top 64 such that the buss 30 extends along both the first and second sides 60, 66 of the support rib 50. The second side 33 of the buss 30 faces and engages the support rib 50. The first side 32 faces outward and is configured to engage the contact 44 when the connector assembly 12 is assembled.

During assembly, the contact 44 is loaded into the cavity 70 of the connector housing 42 and held therein by a peg 96. The connector housing 42 and the contact 44 are then mounted to the mounting surface 18 of the PV module 10 over the locator 40, such that the locator 40 is loaded into the cavity 70 through the opening 80. The alignment posts 56 guide the connector housing 42 over the locator 40. When assembled, the contact supports 58 support the contact 44 and hold the contact 44 in position with respect to the locator 40. In an exemplary embodiment, a sealant 97 is provided on the mounting end 84 that seals between the mounting end 84 and the mounting surface 18 and/or between the connector housing 42 and the locator 40. Optionally, the sealant 97 may be a silicon material, an elastomer sealant such as a room temperature vulcanizing sealant, and the like.

During the mounting process, as the connector housing 42 is being mounted to the mounting surface 18, the contact 44 is pressed onto the buss 30 and support rib 50. The fingers 88, 90 are provided on the corresponding first and second sides 60, 66 of the support rib 50. The fingers 88, 90 engage the first side 32 of the buss 30. The buss 30 and support rib 50 are loaded into the receiving space 92 between the fingers 88, 90. The fingers 88, 90 are at least partially deflected outward as the buss 30 and support rib 50 are loaded into the receiving space 92. As such, the fingers 88, 90 may be biased against the buss 30 to ensure electrical contact to the buss 30. The fingers 88, 90 are terminated to the buss 30 by the direct connection to the buss 30, and no solder or additional clamping is needed to make the termination. Optionally, at least a portion of the buss 30 and the support rib 50 extend through the opening 94 in the base 86 of the contact 44. The connector housing 42 includes a space 98 to accommodate the buss 30 and the support rib 50. The space 98 may accommodate excess material of the buss 30, such as if the buss 30 is folded or bent at a location above the top 64 of the support rib 50.

Figure 6:
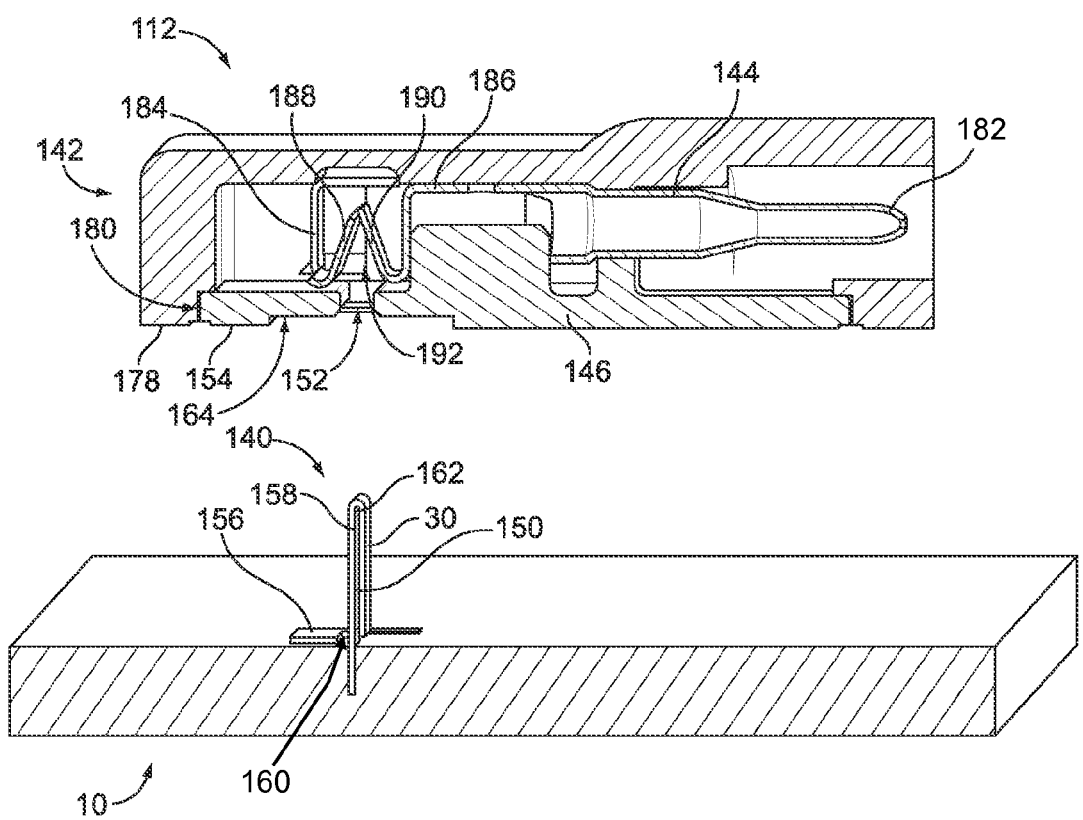
FIG. 6 is a partial sectional view of an alternative connector assembly for the PV module.

FIG. 6 is a partial sectional view of an alternative connector assembly 112 for the PV module 10. The connector assembly 112 includes a locator 140, a connector housing 142 and a contact 144. The connector housing 142 and contact 144 may be substantially similar to the connector housing 42 and contact 44 (shown in FIG. 4). The locator 140 differs from the locator 40 (shown in FIGS. 2 and 3) in that the locator 140 is a two piece locator.

The locator 140 includes a locator body 146 and a support rib 150 separate and discrete from the locator body 146. The support rib 150 is separately provided and configured to be received through a slot 152 in a mounting end 154 of the locator body 146. Optionally, the support 150 may be a metal piece having a base 156 and a leg 158. The base 156 rests on the mounting surface 18 of the PV module 10. The leg 158 is generally perpendicular to the base 156. The buss 30 is wrapped around the leg 158. Optionally, the base 156 may include a slot 160 therethrough, where the buss 30 extends through the slot 160 and is folded around a top 162 of the support rib 150.

After the buss 30 is positioned with respect to the support rib 150, the locator body 146 is lowered onto the mounting surface 18. The buss 30 and support rib 150 extend through the slot 152. The locator body 146 may include a recess 164 in the mounting end 154 that receives the base 156. In an exemplary embodiment, the locator body 146 is coupled to the connector housing 142 prior to mounting the locator body 146 to the support rib 150 and the buss 30. Alternatively, the locator body 146 may be mounted to the PV module 10 independent of the connector housing 142. For example, the locator body 146 may initially be mounted to the PV module 10, and then the connector housing 142 may be mounted to the PV module 10 over the locator body 146. Optionally, the locator 140 and/or the connector housing 142 may be mounted to the PV module 10 by a machine during an automated process.

The connector housing 142 includes a mounting end 178 having an opening 180 through the mounting end 178. The locator body 146 is loaded into the opening 180 and is generally flush with the mounting end 178. Optionally, the locator body 146 may be secured to the connector housing 142, such as by an adhesive. A sealant may be used to seal the joint between the locator body 146 and the connector housing 142.

The contact 144 is a conductive member that is configured to be terminated to the buss 30 by a press-fit connection. The contact 144 includes a mating end 182 and a mounting end 184. The mating end 182 is configured for mating engagement with a mating contact of the plug 14 (shown in FIG. 1). The mounting end 184 is configured for press-fit engagement with the buss 30. The mounting end 184 may include a planar base 186 having a pair of fingers 188, 190 extending from the base 186. When pressed onto the buss 30 and the support rib 150, the fingers 188, 190 are deflected and may be biased against the buss 30 when mated thereto. For example, the buss 30 and the support rib 150 may be received in a receiving space 192 between the fingers 188, 190.

During the mounting process, as the connector housing 142 and locator body 146 are being mounted to the mounting surface 18, the contact 144 is pressed onto the buss 30 and support rib 150. The fingers 188, 190 are provided on corresponding first and second sides 194, 196 of the support rib 150. The fingers 188, 190 engage the buss 30 and are at least partially deflected outward as the buss 30 and support rib 150 are loaded into the receiving space 192. As such, the fingers 188, 190 may be biased against the buss 30 to ensure electrical contact to the buss 30.

Figure 7:
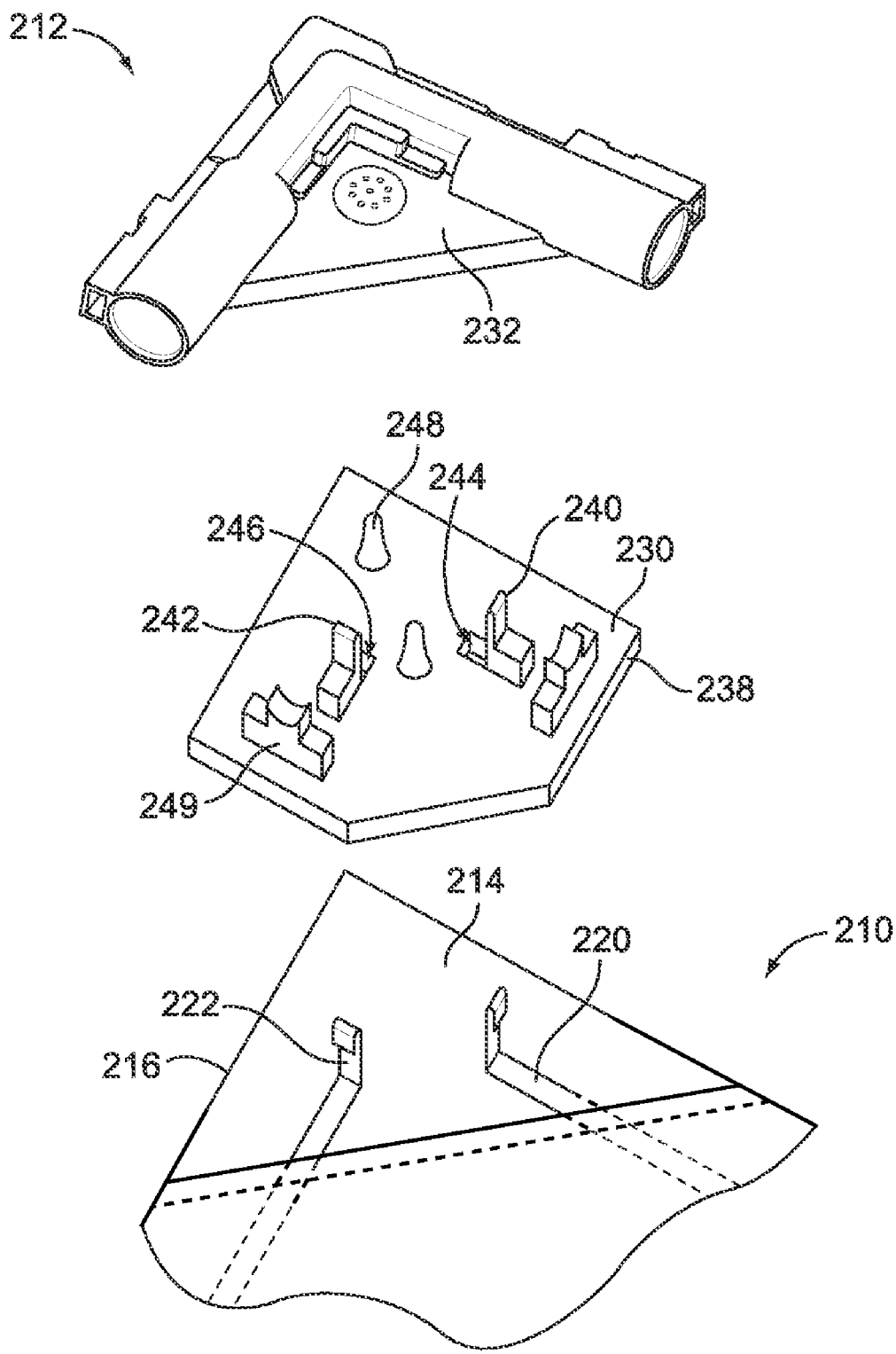
FIG. 7 is an exploded view of another alternative connector assembly for the PV module.

FIG. 7 is an exploded view of another alternative connector assembly 212 for a PV module 210. The PV module 210 is similar to the PV module 10 (shown in FIG. 1), and includes a mounting surface 214. In the illustrated embodiment, the mounting surface 214 is notched out at edges 216, 218 of the PV module 210, such that the connector assembly 212 may be at least partially recessed. The PV module 210 includes a pair of busses 220, 222. The busses 220, 222 may be similar to the buss 30 (shown in FIGS. 2-3). For example, the busses 220, 222 may be connected to corresponding electrodes (not shown). The busses 220, 222 may convey power and/or data signals from the PV cells. For example, the data signals may be a representation of characteristics of the PV module 10, such as an amount of power generation, an efficiency of the PV module 10, a status of the PV cells, and the like. In the illustrated embodiment, the busses 220, 222 are conductive metal strips or conductors represented by a thin, flat foil. The PV module 210 may include more than two busses in alternative embodiments, depending on the number of connections that are made at the junction box defined by the connector assembly 212.

The connector assembly 212 includes a locator 230 and a connector housing 232. The locator 230 is configured to be mounted to the mounting surface 214 proximate to the busses 220, 222. The locator 230 is used to locate the busses 220, 222 for mating with corresponding contacts 234, 236 (shown in FIG. 9) held within the connector housing 232. The connector housing 232 is configured to be mounted to the mounting surface 214 over the locator 230 once the locator 230 and busses 220, 222 are positioned.

The locator 230 includes a locator body 238 that is mounted to and rests on, the mounting surface 214. The locator 230 includes a pair of support ribs 240, 242 extending from the locator body 238. The support ribs 240, 242 are configured to support the busses 220, 222, respectively. The locator 230 includes slots 244, 246 formed through the locator body 238 that are positioned adjacent the support ribs 240, 242, respectively. The slots 244, 246 are sized and shaped to receive the busses 220, 222 therethrough when the locator 230 is mounted to the mounting surface 214. The locator 230 includes alignment posts 248 that align the connector housing 232 with the locator 230 during assembly of the connector assembly 212. The locator 230 includes contact supports 249 that support the contacts 234, 236, respectively, in position with respect to the locator 230.

During assembly, as the locator 230 is mounted to the PV module 210, the locator 230 is positioned such that the slots 244, 246 are aligned with the busses 220, 222. The locator 230 is loaded downward onto the mounting surface 214 with the busses 220, 222 passing through the slots 244, 246. Optionally, the locator 230 may be mounted to the PV module 210 by a machine during an automated process. When the locator 230 is mounted to the PV module 210, the busses 220, 222 extend through the slots 244, 246 and generally extend along the support ribs 240, 242, respectively. The busses 220, 222 may be wrapped around the support ribs 240, 242 such that the busses 220, 222 extend along both sides of the support ribs 240, 242. For example, the busses 220, 222 may be folded or bent proximate to the top of the support ribs 240, 242. Optionally, the busses 220, 222 may be folded by a machine during an automated process.

Figure 8:
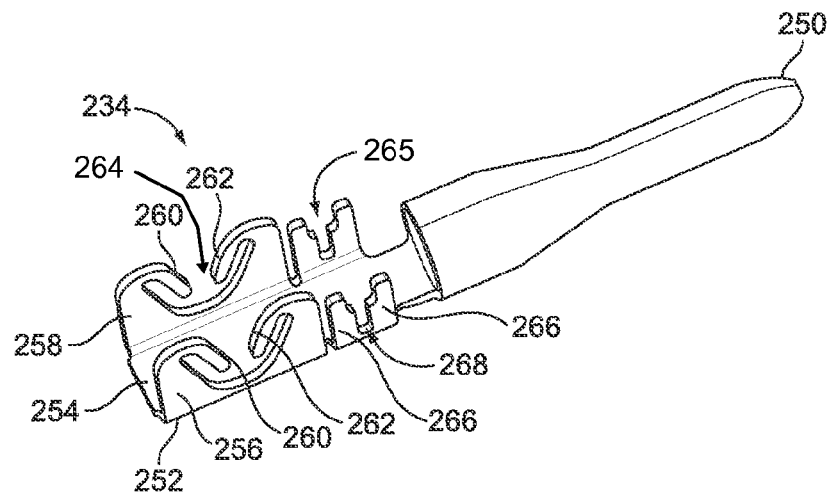
FIG. 8 illustrates a contact for the connector assembly shown in FIG. 7.

FIG. 8 illustrates the contact 234. The contact 236 (shown in FIG. 9) may be identical to the contact 234. The contact 234 is a conductive member that is configured to be terminated to the buss 220 (shown in FIG. 7) by a press-fit connection. For example, the contact 234 may be pressed onto the buss 220. The contact 234 includes a mating end 250 and a mounting end 252. The mating end 250 is configured for mating engagement with a mating contact of a plug, such as the plug 14 (shown in FIG. 1). The mounting end 252 is configured for press-fit engagement with the buss 220.

In an exemplary embodiment, the contact 234 may be stamped and formed from a metal stock and formed into an appropriate shape. The mating end 250 may be rolled into a barrel shape. The mounting end 252 may include a planar base 254 having sidewalls 256, 258. The side walls 256, 258 are bent perpendicular to the base 254. Each side wall 256, 258 includes an engagement portion having a pair of fingers 260, 262. The fingers 260, 262 constitute spring beams that are cantilevered from the side walls 256, 258. The fingers 260, 262 are deflectable and may be biased against the busses 220, 222 when mated thereto. The fingers 260, 262 face one another and define a receiving space 264 therebetween for receiving the busses 220, 222. Distal ends of the fingers 260, 262 may engage one another, and may be spread apart from one another when mounted to the busses 220, 222.

The contact 234 includes diode termination features 265 including beams 266 separated by a gap 268. In an exemplary embodiment, the diode termination features 265 may represent insulation displacement contacts.

Figure 9:
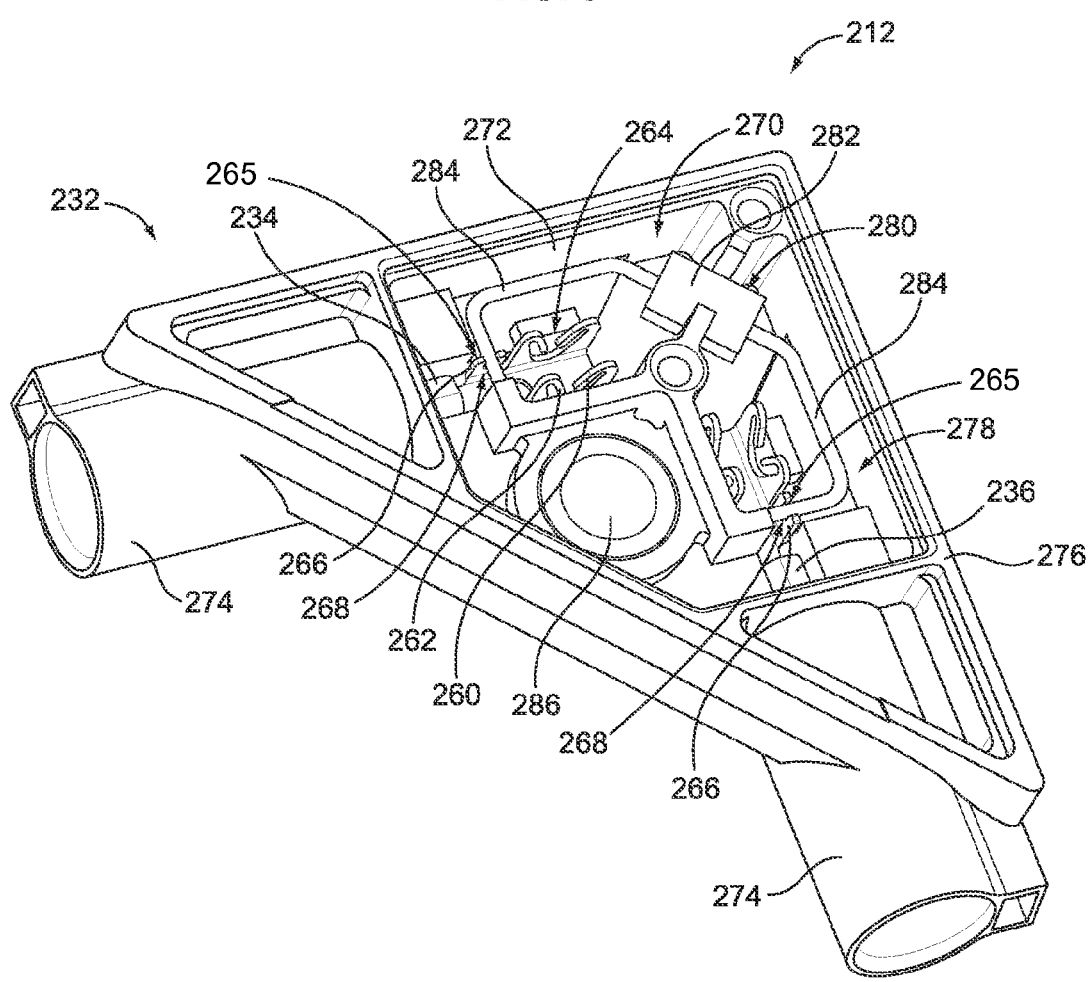
FIG. 9 is a bottom perspective view of a portion of the connector assembly shown in FIG. 7.

FIG. 9 is a bottom perspective view of a portion of the connector assembly 212 illustrating the connector housing 232 and the contacts 234, 236. The connector housing 232 includes a cavity 270 bounded by a plurality of walls 272. Optionally, the walls 272 may have a triangular shape with barrels 274 extending from opposite legs of the triangle. The contacts 234, 236 are configured to be loaded into the cavity 270 and held therein. Any number of contacts may be provided in the connector housing 232 depending on the particular embodiment and the number of busses being terminated within the junction box defined by the connector assembly 212. The locator 230 (shown in FIG. 7) is also configured to be loaded into the cavity 270 when the connector housing 232 is mounted over the locator 230.

The connector housing 232 includes a mounting end 276 having an opening 278 through the mounting end 276. The mounting end 276 may be generally planar and define a sealing surface of the connector housing 232. The opening 278 provides access to the cavity 270. The contacts 234, 236 are loaded through the opening 278 into the cavity 270 such that the mating ends 250 (shown in FIG. 8) are loaded into the barrels 274 for mating with a corresponding mating contact of a plug, similar to the plug 14 (shown in FIG. 1).

The connector assembly 212 includes a diode assembly 280 received in the connector housing 232. The diode assembly 280 includes a diode 282 and leads 284 that extend from the diode 282 to the contacts 234, 236. The leads 284 are mated to the diode termination features 265. For example, the leads 284 may be received in the gaps 268 such that the beams 266 engage the conductive part of the leads 284. Once the diode assembly 280 is connected to the contacts 234, 236, the diode assembly 280 defines a bypass feature that electrically connects the contacts 234, 236 together.

The connector assembly 212 includes a breather element 286 coupled to the connector housing 232. The breather element 286 allows air to pass from the cavity 270 to the external environment, which allows for equalization of pressure and/or temperature in the connector housing 232. Optionally, moisture and air may be able to pass through the breather element 286 from the cavity 270 to the external environment without allowing moisture to re-enter the cavity 270.

With reference also to FIG. 7, assembly of the connector assembly 212 may be similar to assembly of the connector assembly 12 (shown in FIGS. 1-5). The contacts 234, 236 are loaded into the cavity 270 and held therein for mating with the diode assembly 280, and ultimately the busses 220, 222. For example, the diode assembly 280 is loaded into the connector housing 232 such that the leads 284 are terminated to the contacts 234, 236. The connector housing 232 is then ready for mounting to the PV module 210 and locator 230. as the connector housing 232 is mounted to the PV module 210, the connector housing 232 is loaded over the locator 230. The locator 230 properly aligns the connector housing 232, and thus the contacts 234, 236 with the busses 220, 222. As the connector housing 232 is moved into position, the busses 220, 222 and support ribs 240, 242 are loaded into the receiving space 264 between the fingers 260, 262. Optionally, the busses 220, 222 may engage the fingers 260, 262 of only one of the side walls 256 or 258. The contacts 234, 236 are pressed onto the busses 220, 222 such that the fingers 260, 262 are at least partially deflected outward as the busses 220, 222 and support ribs 240, 242 are loaded into the receiving space 264. The fingers 260, 262 are thus biased against the busses 220, 222 to ensure electrical contact to the busses 220, 222. The fingers 260, 262 are terminated to the busses 220, 222 by the direct connection to the busses 220, 222, and no solder or additional clamping is needed to make the termination.

It is to be understood that the above description is intended to be illustrative, and not restrictive. For example, the above-described embodiments (and/or aspects thereof) may be, used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C.§112, sixth paragraph, unless and until such claim limitations expressly use the phrase "means for" followed by a statement of function void of further structure.

What is claimed is:

1. A connector assembly for a photovoltaic module, the connector assembly comprising;
   a locator having a support rib configured to hold a buss of the photovoltaic module, the support rib includes a first side and a second side, the buss being wrapped around the support rib on the first and second sides; and
   a connector housing holding a contact, the connector housing being configured to be mounted to the photovoltaic module over the locator such that the contact is mated to the buss in a press-fit connection, the contact being arranged on both the first and second sides to engage the buss.

2. The connector assembly of claim 1, wherein the contact directly engages the buss when the connector housing is mounted over the locator.

3. The connector assembly of claim 1, wherein the contact includes a finger configured to be biased against the buss when the connector housing is mounted over the locator.

4. The connector assembly of claim 1, wherein the locator includes a locator body configured to be mounted to the photovoltaic module, the support rib being integrally formed with the locator body, the locator body having a slot adjacent the support rib with the buss extending through the slot along the support rib.

5. The connector assembly of claim 1, wherein the contact includes a first finger and a second finger, the support rib includes a first side and a second side, the support rib being configured to support the buss on the first side and the second side, wherein the first finger is biased against the first side and corresponding portion of the buss and the second finger is biased against the second side and corresponding portion of the buss.

6. The connector assembly of claim 1, wherein the connector housing includes a cavity, the contact being loaded into the cavity and being held therein, the locator being loaded into the cavity when the connector housing is mounted over the locator.

7. The connector assembly of claim 1, wherein the connector housing includes a mounting end having an opening through the mounting end, the locator being loaded through the opening when the connector housing is mounted over the locator.

8. The connector assembly of claim 1, wherein the connector housing includes a mounting end having a sealing surface, the connector assembly further comprising a sealant applied to the sealing surface, the sealant sealing the mounting end against the photovoltaic module.

9. A connector assembly for a photovoltaic module, the connector assembly comprising:
- a locator having a first support rib configured to hold a first buss of the photovoltaic module and a second support rib configured to hold a second buss of the photovoltaic module, the first and second support ribs each include a first side and a second side, the first buss being wrapped around the first support rib on the first and second sides thereof, the second buss being wrapped around the second support rib on the first and second sides thereof; and
- a connector housing holding a first contact and a second contact, the connector housing being configured to be mounted to the photovoltaic module over the locator such that the first and second contacts are mated to the first and second buss, respectively, in press-fit connections, the first contact being arranged on both the first and second sides of the first support rib to engage the first buss, the second contact being arranged on both the first and second sides of the second support rib to engage the second buss.

10. The connector assembly of claim 9, further comprising a diode hold within the connector housing, the diode being electrically connected to both the first and second contacts.

11. The connector assembly of claim 9, wherein the first and second contacts are configured to slide along, and directly engage, the first and second buss, respectively, when the connector housing is mounted over the locator.

12. The connector assembly of claim 9, wherein the first contact includes a finger configured to be biased against the first buss when the connector housing is mounted over the locator.

13. The connector assembly of claim 9, wherein the first contact has fingers being arranged on both the first and second sides of the first support rib, the fingers being configured to engage the first buss.

14. The connector assembly of claim 9, wherein the locator includes a locator body configured to be mounted to the photovoltaic module, the first and second support ribs being integrally formed with the locator body, the locator body having first and second slots adjacent the first and second support ribs, respectively, wherein the first and second slots are configured to receive the first and second busses, respectively, such that the first buss extends along the first support rib and the second buss extends along the second support rib for mating engagement with the first and second contacts, respectively.

15. The connector assembly of claim 9, wherein the connector housing includes a cavity, the first and second contacts being loaded into the cavity and being held therein prior to being mounted over the locator, the locator being loaded into the cavity when the connector housing is mounted over the locator such that the first and second contacts are configured to engage the first and second busses during mounting of the connector housing over the locator.

16. A connector assembly for a photovoltaic module, the connector assembly comprising:
- a locator having a support rib having a first side and a second side; the locator being positioned on the photovoltaic module such that a buss of the photovoltaic module is wrapped around the support rib on the first and second sides of the support rib; and
- a connector housing holding a contact, the connector housing having a mounting end and an opening through the mounting end, the connector housing being configured to be mounted to the photovoltaic module in a loading direction such that the locator is loaded through the mounting end, wherein the contact engages the buss on the first and second sides in a press-fit connection as the connector housing is moved in the loading direction.

17. The connector assembly of claim 16, wherein the contact directly engages the buss when the connector housing is mounted over the locator.

18. The connector assembly of claim 16, wherein the contact includes first and second fingers configured to be biased against the first and second sides of the support rib and the buss when the connector housing is mounted over the locator.

19. The connector assembly of claim 16, wherein the locator includes a locator body configured to be mounted to the photovoltaic module, the support rib being integrally formed with the locator body, the locator body having a slot adjacent the support rib with the buss extending through the slot along the support rib.

* * * * *